United States Patent [19]
Consolatti et al.

[11] Patent Number: 5,889,991
[45] Date of Patent: Mar. 30, 1999

[54] METHOD AND SYSTEM FOR CUSTOMIZING A PALETTE USING ANY JAVA CLASS

[75] Inventors: Scott Michael Consolatti, Raleigh; Michael David Harris, Durham; Carol Ann Jones, Raleigh, all of N.C.

[73] Assignee: International Business Machines Corp., Armonk, N.Y.

[21] Appl. No.: 761,692

[22] Filed: Dec. 6, 1996

[51] Int. Cl.⁶ .................................................. G06F 15/00
[52] U.S. Cl. ............................................................ 395/701
[58] Field of Search ..................... 395/701, 682, 395/705, 500; 345/340, 435

[56] References Cited

U.S. PATENT DOCUMENTS

| | | | |
|---|---|---|---|
| 5,414,806 | 5/1995 | Richards | 345/435 |
| 5,522,073 | 5/1996 | Courant et al. | 395/701 |
| 5,583,983 | 12/1996 | Schmitter | 395/705 |
| 5,651,108 | 7/1997 | Cain et al. | 345/340 |
| 5,715,432 | 2/1998 | Xu et al. | 395/500 |

*Primary Examiner*—James P. Trammell
*Assistant Examiner*—Matthew Smithers
*Attorney, Agent, or Firm*—A. Bruce Clay

[57] ABSTRACT

A software class including known system events is imported into the palette of a development tool. After selecting a class for import, all variables and methods in the class meeting predetermined criteria are discovered. The variables are marked as properties, the methods as actions and the system events as events. A capture method is generated to capture the events and forward them to the development tool. Then, an invoke method is generated to execute each of the actions, a set method is generated to set a value for each of the properties, and a get method is generated to retrieve each value. Finally, a new subclass comprising the capture method, the invoke method, the set method and the get method is generated and added to the palette.

12 Claims, 10 Drawing Sheets

METHOD AND SYSTEM FOR CUSTOMIZING A PALETTE USING ANY JAVA CLASS

FIELD OF THE INVENTION

This invention relates in general to computer software, and in particular to a method and system for customizing a palette using any Java class.

BACKGROUND OF THE INVENTION

Application development tools are frequently provided to program developers to make the job of programming simpler and more efficient. A technique that has been developed to assist novice and intermediate programmers using such tools, such as VisualAge for Smalltalk from International Business Machines Corp. and Visual Basic from Microsoft, has been the concept of visual programming from parts. In addition to the underlying programming language, such tools provide a selection of pre-built software parts or components presented to a software developer via an icon in a graphical user interface together with an open work space. By simply selecting one of the icons and dragging it into the work space, the developer in effect programs an application that the developer is creating to include the code for the function of the part or component which the icon represents.

Programming from parts is especially effective for developing graphical user interfaces for software applications being created, but is also employed for adding many types of functions to applications such as communication, database access, multimedia, etc. With the advent of the World Wide Web, another natural extension is for use with the Java language and the creation of home pages for businesses.

Many currently available tools use "plugin," "construction from parts" or similar technologies, but do not provide a simple mechanism for an end user to add objects to the tool's palette of parts. These tools tend to provide support for adding pre-built parts supplied by a third party vendor, which necessarily needs to be an expert programmer. When the user has a need for a part that cannot be obtained from a parts vendor, the only option is to write source code for a custom part. Since the general computer using public does not have the programming skill required to write the necessary source code, creating these kinds of custom parts is limited to the computer programmer.

Another problem with programming from parts is that every application development tool has different requirements for the structure of the parts. That is, for example, parts developed for Visual Basic do not work with parts for VisualAge, and vice-versa. The process of enabling software parts to be available within a specific development tool is difficult, as indicated above, requiring the writing of code that conforms to a specification provided by that specific development tool.

There are, however, hundreds of Java classes available on the Internet for reuse, and this number grows daily. There is no known way to import these classes onto a parts palette, especially when many of the classes are not designed for use with a particular tool. Thus, there is a need for a method and system which allows customizing a palette using any Java class.

SUMMARY OF THE INVENTION

The present invention comprises a method and system of importing a software class into a palette of a development tool, which substantially eliminates the problems associated with different tool architectures and requirements.

In one embodiment, the present invention comprises a method of importing software into a palette of a development tool on a computer system. A user selects a class for import, the class including known system events. All variables and methods in the class meeting predetermined criteria are discovered. The variables are marked as properties, the methods are marked as actions and the system events are marked as events. A capture method is generated to capture the events and forward them to the development tool. An invoke method is generated to execute each of the actions. A set method is generated to set a value for each of the properties. A get method is generated to retrieve each of the values. Then, a new subclass, dependant upon the original class, is generated. The new subclass, comprising the capture method, the invoke method, the set method and the get method, is added to the palette.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
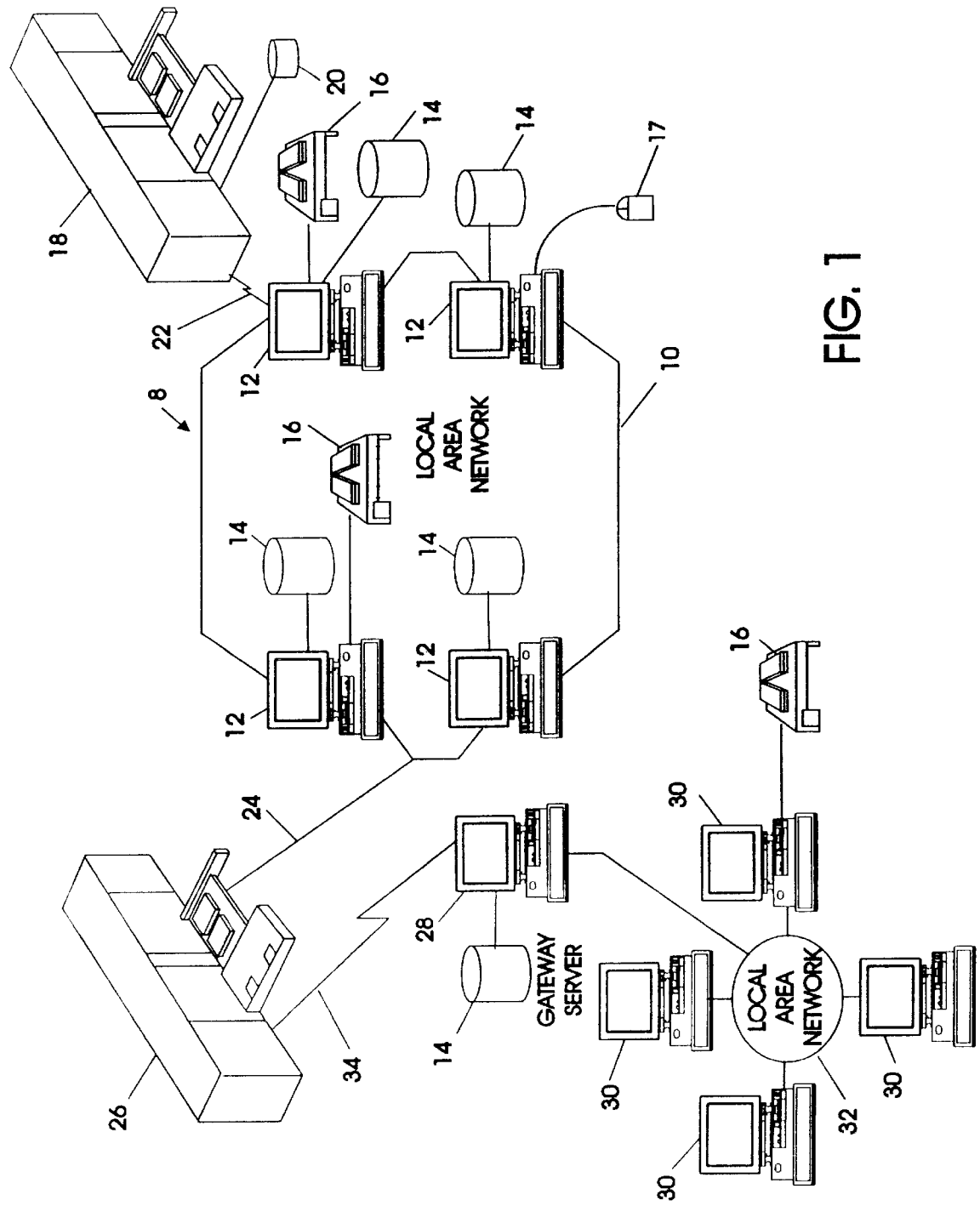
FIG. 1 is a pictorial representation of a data processing system which may be utilized to implement a method and system of the present invention.

Referring to FIG. 1, there is depicted a graphical representation of a data processing system 8, which may utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that plurality of Intelligent Work Stations (IWS) coupled to a host processor may be utilized or each such network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects maybe stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

In the preferred embodiment, the present invention is implemented in the Java object oriented language. Application development tools for object oriented development languages, such as Java, Smalltalk, and C++, typically include class libraries or parts or components for use by developers when programming with the development tool. Class libraries are reusable sets of code which usually provide a relatively high level of function which a developer may add to a software application being created. Class libraries are hierarchical in nature, in that a parent or superclass includes characteristics which are inherited by subclasses of the parent class. The subclasses may have further subclasses.

The developer utilizes the code already written for the desired function within the class library by selecting one of the classes for inclusion in the application under development. A copy or "instance" of the class is included in the application being created. The instance includes not only the selected class but all necessary classes from the class parent classes within the hierarchy to make the instance functional during execution of the application.

As an example, suppose there is a new Java class that has been published on the Internet. This class is called "NervousText" and its purpose is to display a single line of text and randomly move the characters around. To use this class in a Java development tool, this new class must be added to the tool's parts palette.

Ordinarily, the programmer who created NervousText would follow steps similar to the following:

1) In the source code definition of NervousText, declare the class to be a subclass of a particular abstract class (e.g. "PartClass"), which is defined in advance by the vendor of the development tool.

```
---------
| PartClass |
|         |
---------
    |
    |
---------
| Nervous |
| Text    |
---------
```

The exact name of this class varies from one tool vendor to another, making it impossible for NervousText to be added to the palette of more than one development tool;

2) In the source code for NervousText, certain methods would be required. Typically, these methods would describe the actions and properties of NervousText, and would perform a variety of functions that enable NervousText to be rendered in the development tool and on its parts palette. The names and exact functions of these methods is unique for every development tool, again making it impossible for NervousText to fit into more than one tool.

The technical details of these steps are well documented for popular development tools such as Visual Basic and VisualAge, in a special programmer's manual.

Figure 2A:
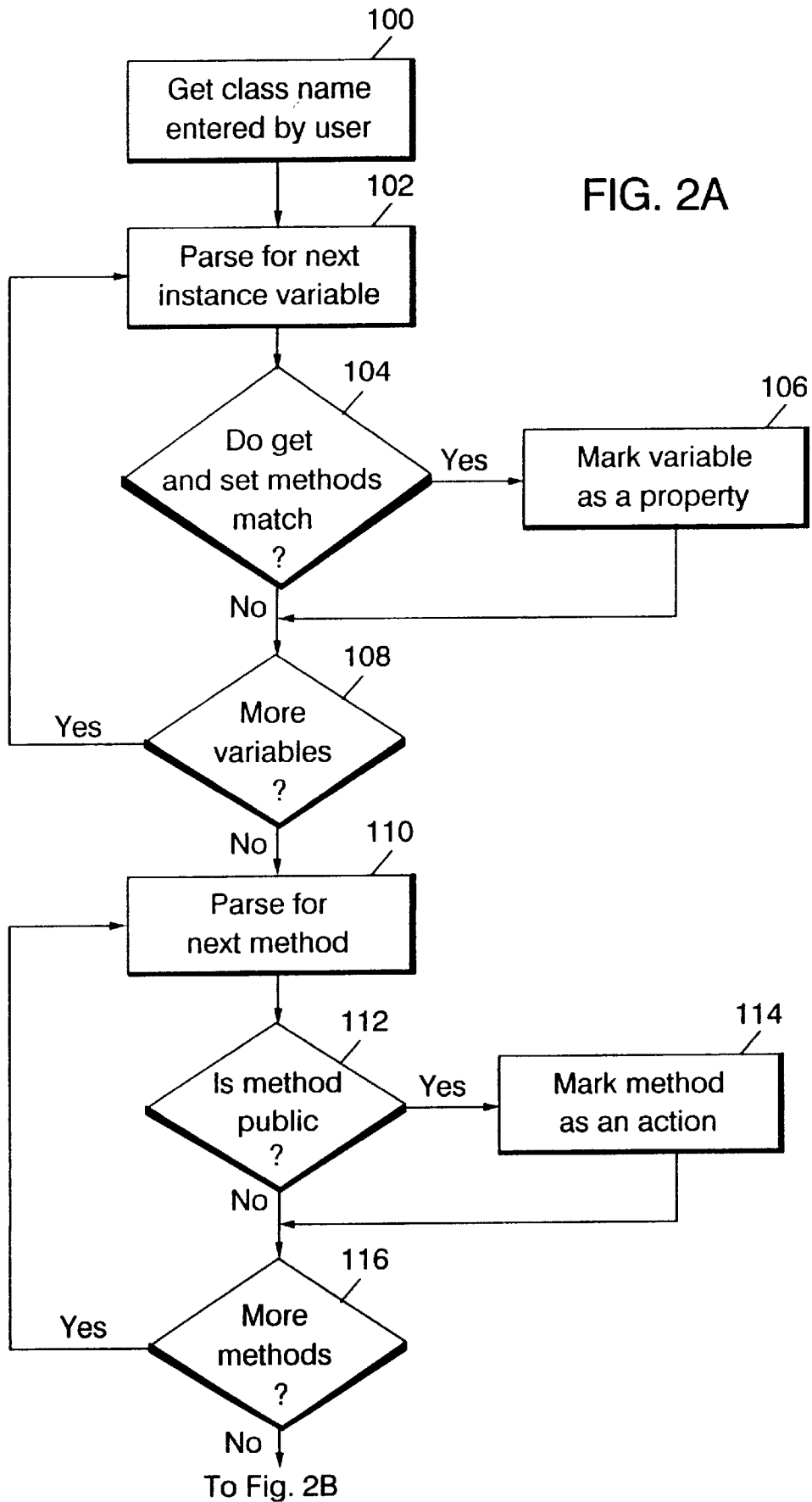
FIGS. 2A and 2B are a graphical representation of a high level flow chart of the present invention.
Figure 2B:
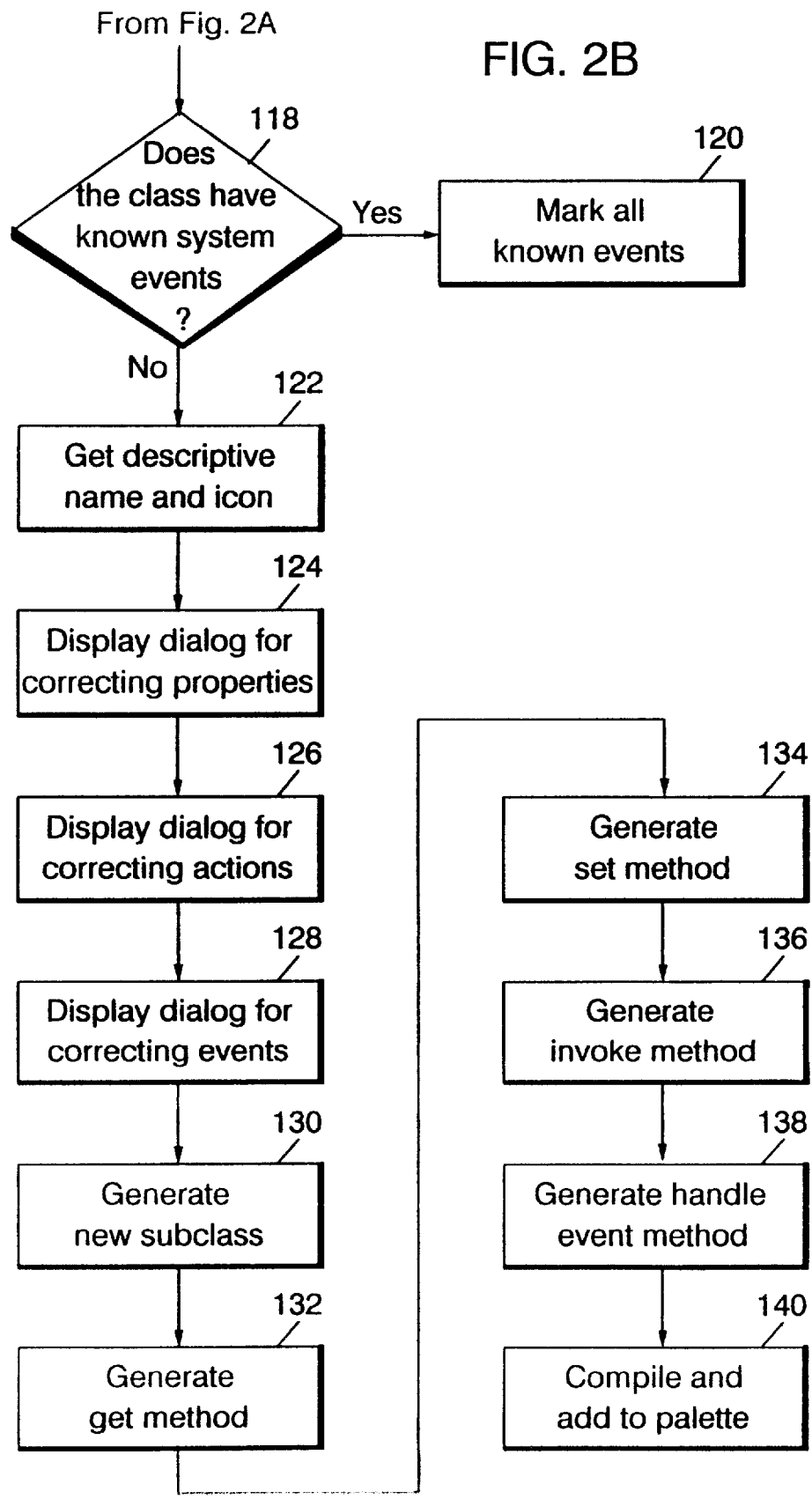

A high level flowchart illustrating the present invention is shown in FIGS. 2A and 2B. The present invention starts at block 100 where a user enters the class name of the class to be obtained. At block 102 the code for the class is parsed for a next instance variable. At decision block 104 it is determined whether or not a get and a set method matches. If the response decision block 104 is yes, a variable is marked as a property at block 106. If the response to the decision block 104 is no and subsequent to block 106, it is determined at decision block 108 whether or not there are more variables. If the response to the decision block 108 is yes, the present invention returns to block 102. If the response to the decision block 108 is no, the code is parsed for the next method at block 110.

At decision block 112 it is determined whether or not the method is public. If the response to the decision block 112 is yes, the method is marked as an action at block 114. If the response to the decision block 112 is no and subsequent to block 114, it is determined at decision block 116 whether or not there are more methods. If the response to the decision block 116 is yes, the present invention returns to block 110. If the response to decision block 116 is no, it is determined at decision block 118 whether or not the class has any known system events. If the response to decision block 118 is yes, all known events are marked at block 120. If the response to decision block 118 is no, a descriptive name and icon is obtained at block 122.

At block 124 a dialogue is displayed for correcting any need for making any needed corrections to properties. At block 126 a dialogue is displayed for making any needed corrections to actions. At block 128, a dialogue is displayed for making any needed corrections to events.

At block 130 a new subclass is generated. At block 132 a "get" method is generated. At block 134, a "set" method is generated. At block 136, an "invoke" method is generated. At block 138, a handle "Event" method is generated. The present invention then compiles and adds the subclass to the palette at block 140.

Figure 3:
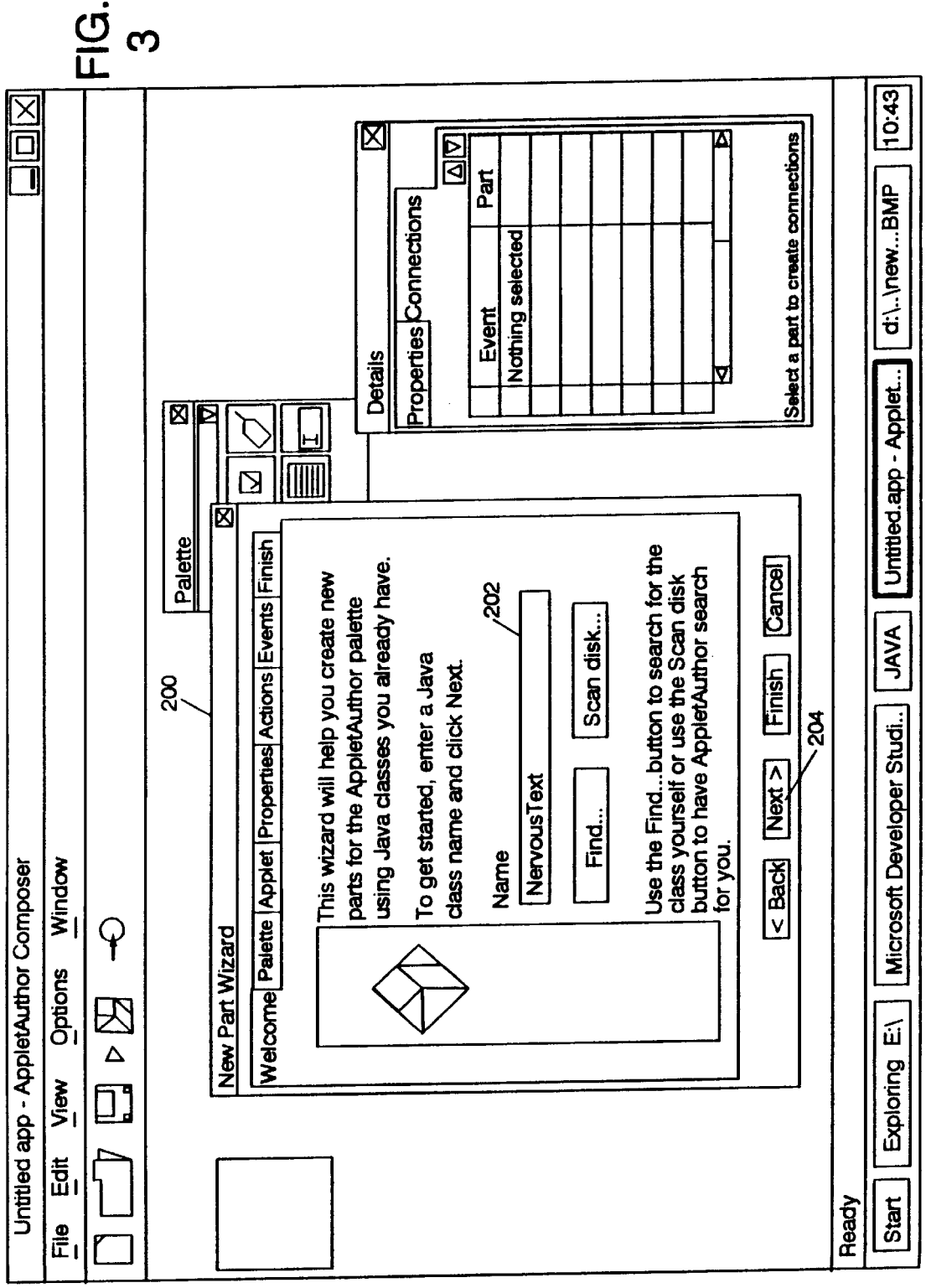
FIG. 3 depicts a dialogue window for initiating use of the present invention.

Referring to FIGS. 3–9, the present invention is illustrated in use with an example. Referring first to FIG. 3, a dialogue window 200 is shown for initiating the addition of a new part to a palette. The user enters in field 202 a name of the class to be imported. In the example shown in FIG. 3, Nervous-Text is the class selected. By clicking on a "Next" push-button 204, the present invention parses the compiled code of the Nervous Text class to discover all of the instance variables in the class. Instance variables are marked for inclusion as properties, if there is a corresponding "get" and "set" method for the variable (FIG. 2A, blocks 102–108). "Corresponding" herein means that the names and data types match, for example only, if the variable is named "a" the get method must be named "getA" and the set method must be named "setA". Also, if "a is an integer" then the "getA" must return an integer and "setA" must take an integer as its only parameter.

The present invention parses the compiled code of NervousText and discovers all the methods. Methods declared as public are marked for inclusion as actions (public is defined as a method that can be called from outside of the class), see FIG. 2A, blocks 110–116. All known system events are also marked for inclusion as events (FIG. 2B, blocks 118, 120).

Figure 4:
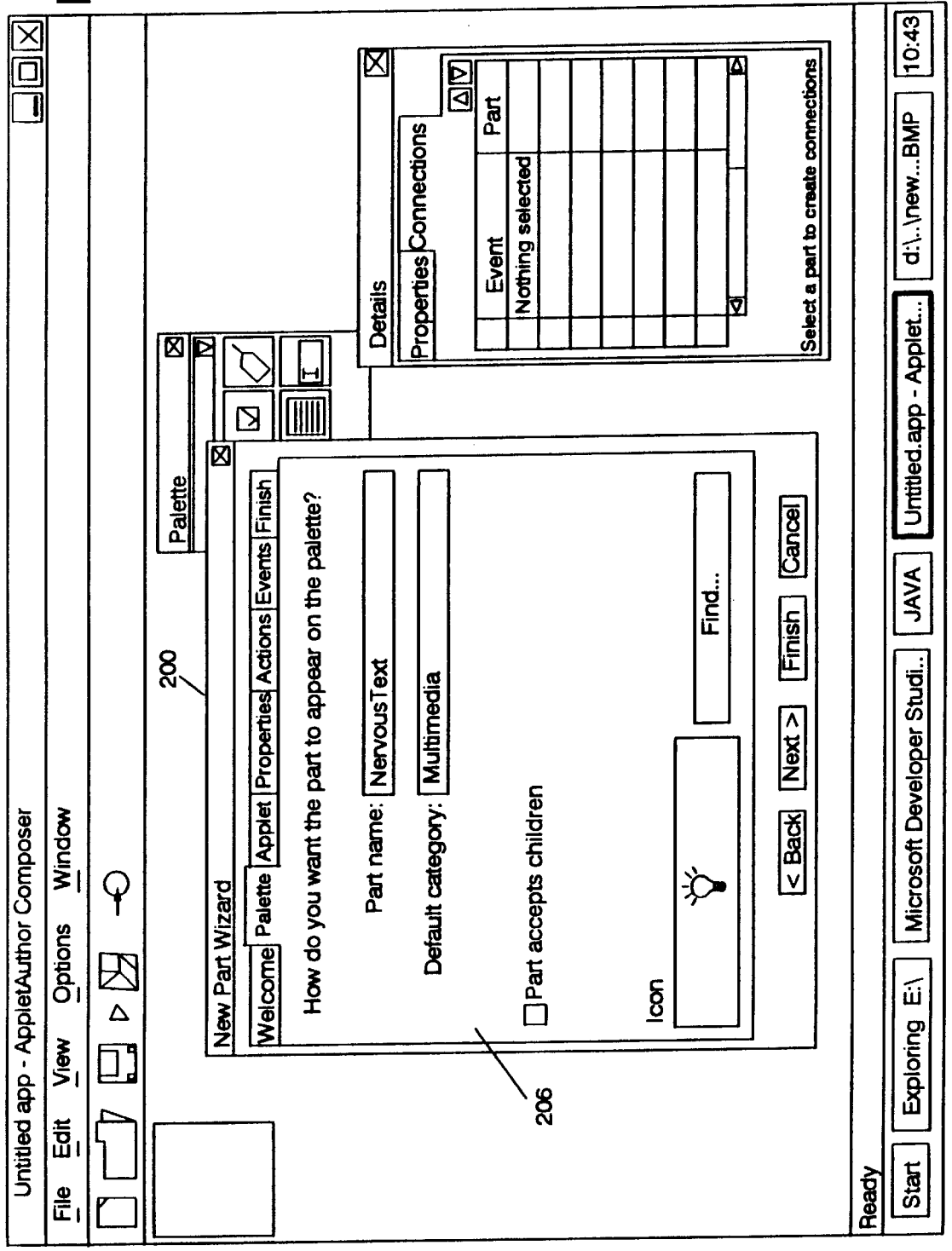
FIG. 4 is a data entry window for the present invention.
Figure 5:
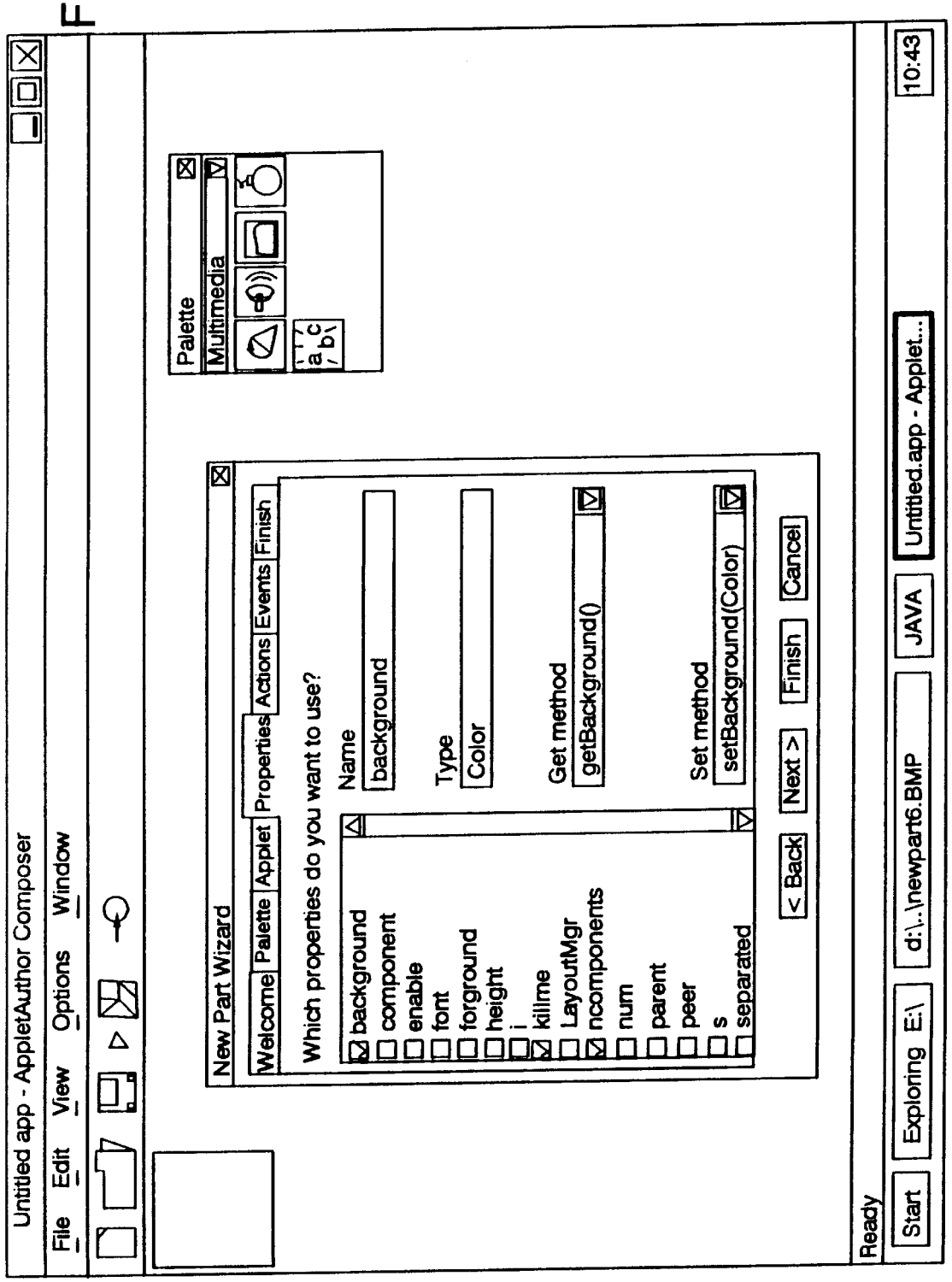
FIGS. 5, 6 and 7 illustrate user capability to change any default settings.
Figure 6:
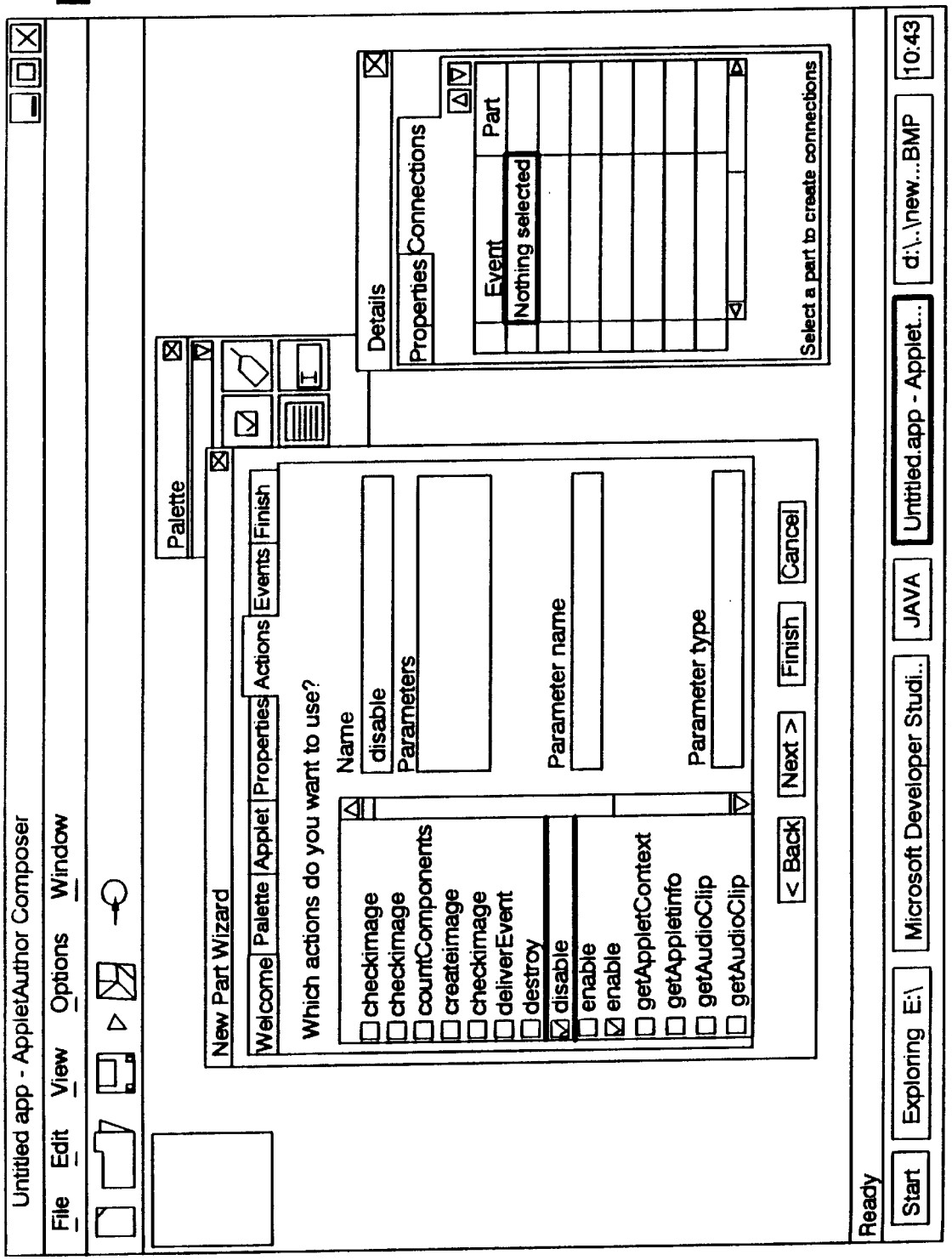
Figure 7:
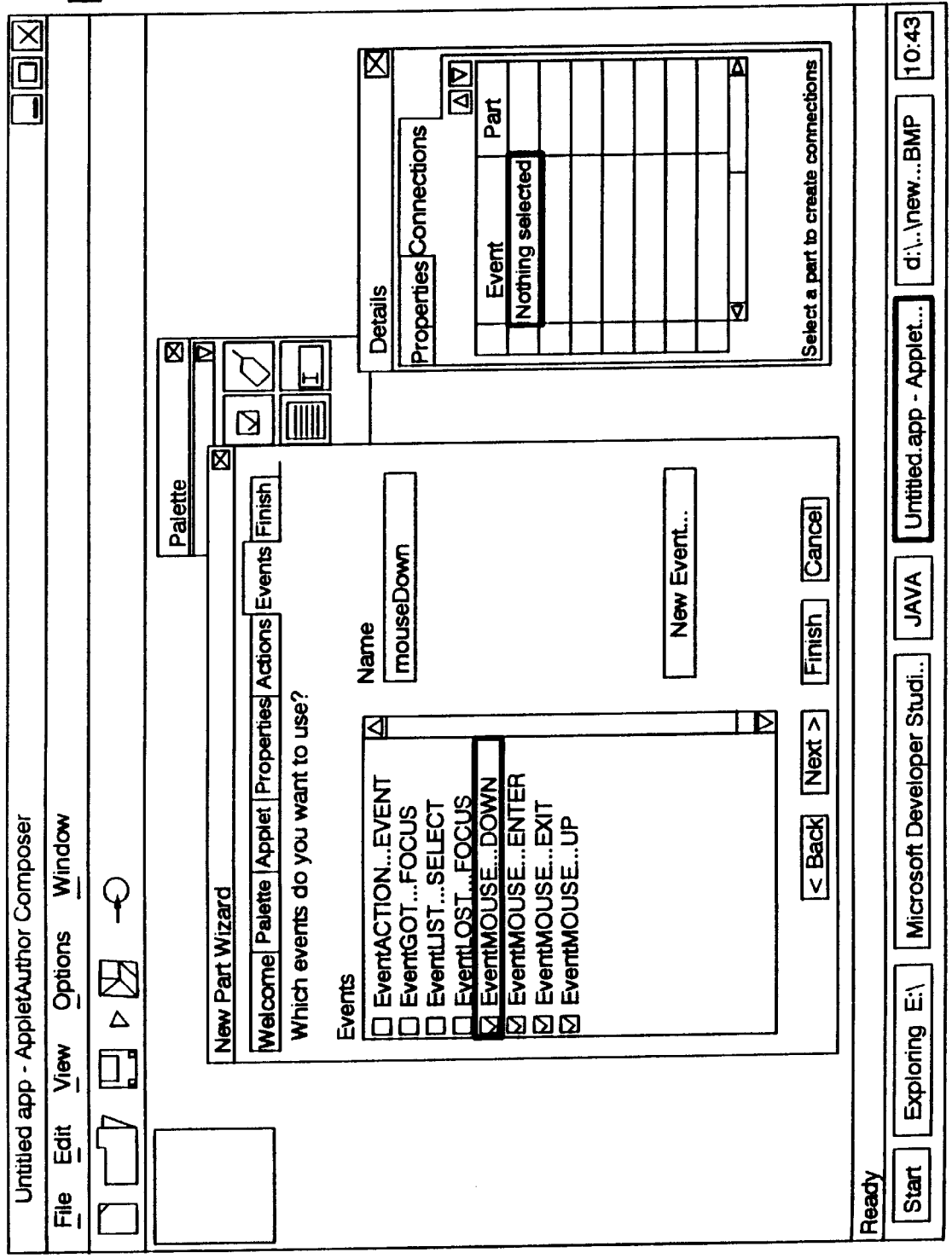

Referring to FIG. 4, the user enters descriptive information in dialogue window 206 about the class including a descriptive name and icon "FIG. 2B block 122". Referring to FIGS. 5, 6 and 7, the user can correct anything that has been marked by default as an incorrect choice. Once the appropriate selections are made for actions, properties and text and events, the system generates a new subclass of NervousText, called "NervousTextPart".

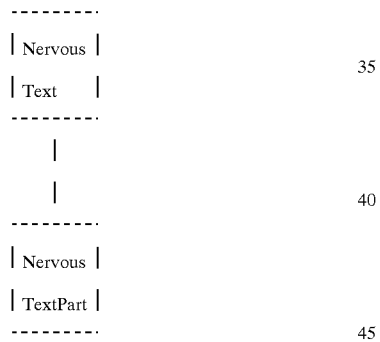

Inside this new class, a method is generated to describe get each of the properties defined above, using get methods found while parsing the class or entered by the user. A method is then generated to invoke each of the actions using the method name parsed from the class or entered by the user and using the names and data types of all parameters to this action (FIG. 2B block 136).

Figure 8:
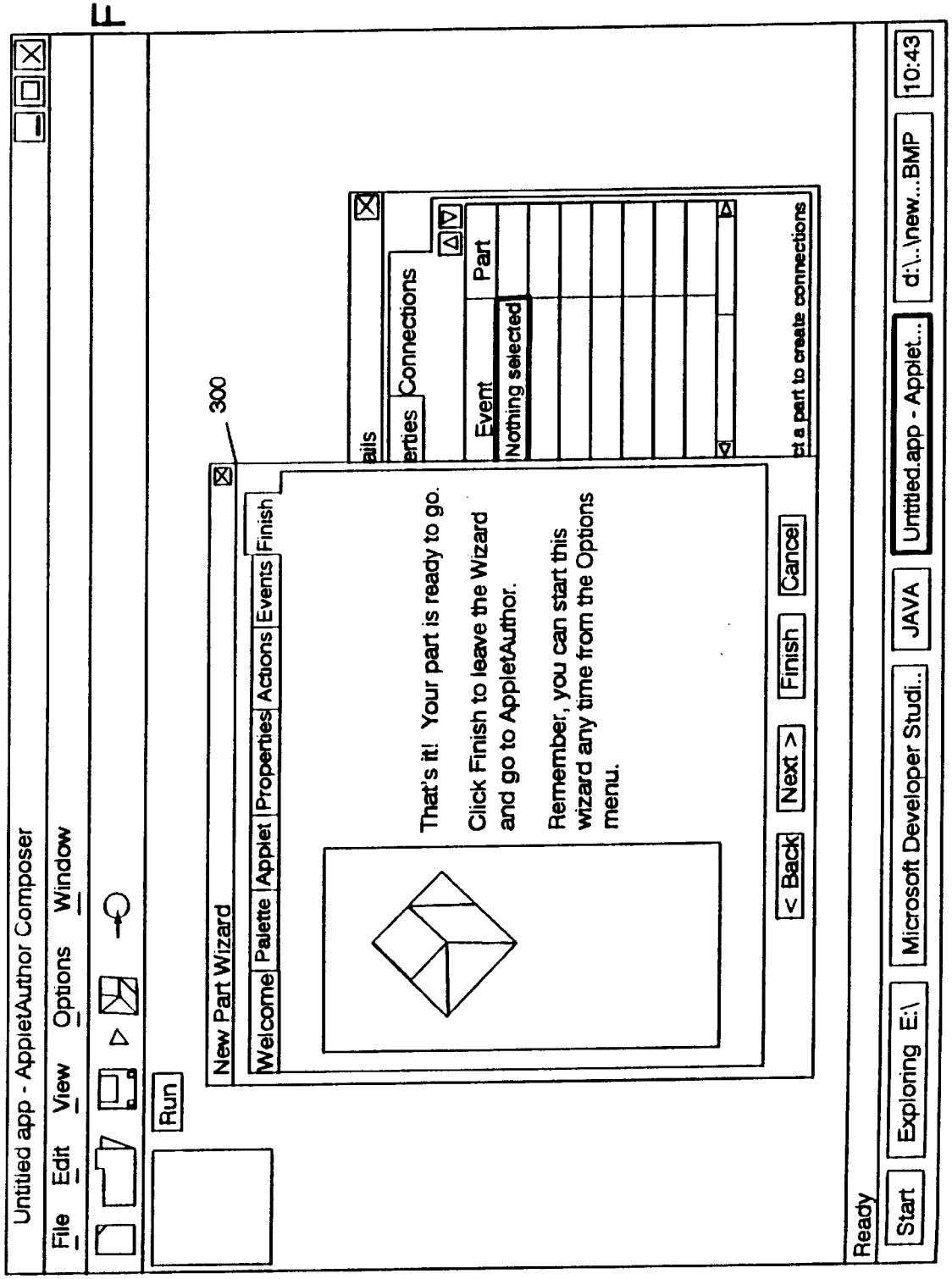
FIG. 8 represents a completion indication window.
Figure 9:
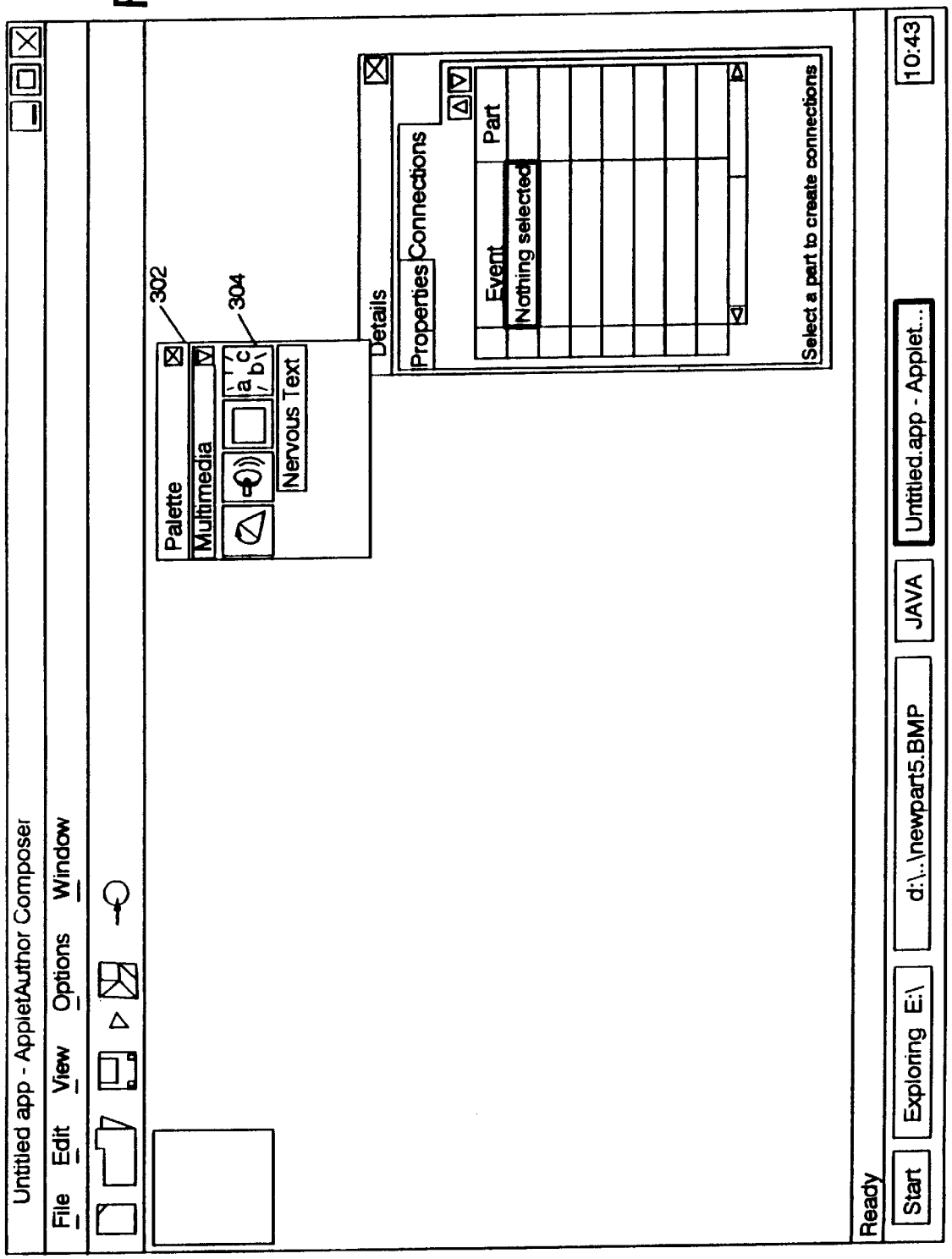
FIG. 9 illustrates a successfully updated tool palette.

A method is then generated to capture system events and events entered by the user (FIG. 2B, block 128) and forward them to the development tool. Referring to FIG. 8, a completion indication window 300 is shown to provide the user with the information that all actions have been completed. Referring to FIG. 9, the development tool palette 302 is shown with an icon 304 added thereto for the NervousText class. Thus, the present invention greatly simplifies the task of adding a class to a development tool palette and makes it possible to do so for all parts and all tools.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of importing any arbitrary software class into a palette of a development tool on a computer system, comprising the steps of:

selecting an arbitrary class for import, said arbitrary class including known system events;

discovering all variables and methods in said arbitrary class meeting predetermined criteria;

marking said variables as properties, said methods as actions and said system events as events;

generating a capture method to capture said events and forward them to the development tool;

generating an invoke method to execute each of said actions;

generating a set method to set a value for each of said properties;

generating a get method to retrieve each said value; and generating a new subclass dependant upon said arbitrary class, said subclass comprising said capture method, said invoke method, said set method and said get method, wherein said subclass is added to the palette.

2. The method of claim 1, further comprising the step of:

generating a descriptive property method for each of said properties, a descriptive action method for each of said actions and a descriptive event method for each of said events.

3. The method of claim 1, further comprising the step of:

generating preferred methods to indicate which of said properties, said actions and said events are most preferred.

4. The method of claim 1, further comprising the step of:

compiling said new subclass.

5. A system for importing any arbitrary software class into a palette of a development tool on a computer system, comprising:

means for selecting an arbitrary class for import, said arbitrary class including known system events;

means for discovering all variables and methods in said arbitrary class meeting predetermined criteria;

means for marking said variables as properties, said methods as actions and said system events as events;

means for generating a capture method to capture said events and forward them to the development tool;

means for generating an invoke method to execute each of said actions;

means for generating a set method to set a value for each of said properties;

means for generating a get method to retrieve each said value; and means for generating a new subclass dependant upon said arbitrary class, said subclass comprising said capture method, said invoke method, said set method and said get method, wherein said subclass is added to the palette.

6. The system of claim 5, further comprising:

means for generating a descriptive property method for each of said properties, a descriptive action method for each of said actions and a descriptive event method for each of said events.

7. The system of claim 5, further comprising:

means for generating preferred methods to indicate which of said properties, said actions and said events are most preferred.

8. The system of claim 5, further comprising:

means for compiling said new subclass.

9. A computer program product for importing any arbitrary software class into a palette of a development tool on a computer system, comprising:

computer readable means for selecting an arbitrary class for import, said arbitrary class including known system events;

computer readable means for discovering all variables and methods in said arbitrary class meeting predetermined criteria;

computer readable means for marking said variables as properties, said methods as actions and said system events as events;

computer readable means for generating a capture method to capture said events and forward them to the development tool;

computer readable means for generating an invoke method to execute each of said actions;

computer readable means for generating a set method to set a value for each of said properties;

computer readable means for generating a get method to retrieve each said value; and computer readable means for generating a new subclass dependant upon said arbitrary class, said subclass comprising said capture method, said invoke method, said set method and said get method, wherein said subclass is added to the palette.

10. The program product of claim 9, further comprising:

computer readable means for generating a descriptive property method for each of said properties, a descriptive action method for each of said actions and a descriptive event method for each of said events.

11. The program product of claim 9, further comprising:

computer readable means for generating preferred methods to indicate which of said properties, said actions and said events are most preferred.

12. The program product of claim 9, further comprising:

computer readable means for compiling said new subclass.

\* \* \* \* \*